C. J. COLEMAN.
HYDRAULIC POWER TRANSMISSION SYSTEM.
APPLICATION FILED OCT. 9, 1906. RENEWED OCT. 14, 1910.

993,653.

Patented May 30, 1911.
7 SHEETS—SHEET 1.

Witnesses
Wm. A. Kelly
Bernard Rowen

Inventor
Clyde J. Coleman
By his Attorney
Henry D. Williams

C. J. COLEMAN.
HYDRAULIC POWER TRANSMISSION SYSTEM.
APPLICATION FILED OCT. 9, 1906. RENEWED OCT. 14, 1910.

993,653.

Patented May 30, 1911.
7 SHEETS—SHEET 3.

C. J. COLEMAN.
HYDRAULIC POWER TRANSMISSION SYSTEM.
APPLICATION FILED OCT. 9, 1906. RENEWED OCT. 14, 1910.

993,653.

Patented May 30, 1911.

Witnesses

Inventor
Clyde J. Coleman
By his Attorney
Henry D. Williams

UNITED STATES PATENT OFFICE.

CLYDE J. COLEMAN, OF NEW YORK, N. Y., ASSIGNOR TO CONRAD HUBERT, OF NEW YORK, N. Y.

HYDRAULIC POWER-TRANSMISSION SYSTEM.

993,653.   Specification of Letters Patent.   Patented May 30, 1911.

Application filed October 9, 1906, Serial No. 338,101. Renewed October 14, 1910. Serial No. 587,119.

*To all whom it may concern:*

Be it known that I, CLYDE J. COLEMAN, a citizen of the United States, residing in the borough of Manhattan, city of New York, in the county of New York and State of New York, have invented certain new and useful Improvements in Hydraulic Power-Transmission Systems, of which the following is a specification, reference being had therein to the accompanying drawings, forming a part thereof.

My invention relates generally to hydraulic power transmission and more particularly to a hydraulic system of distributing power from a central point within a shop or manufacturing establishment to a multiplicity of points therein, and has for its objects economy and simplicity of construction, economy of maintenance, economy and simplicity of operation, absence of noise, economy of space, and other objects and advantages which will hereinafter appear. Heretofore in such instances the general practice has been to distribute power by line shafts, belting and cone pulleys, or by an electrical system of distribution, and sometimes by a combination of the two, the transmission of power throughout the building to the different floors being electrical and the transmission throughout a floor to the different points thereon of using the power being by shafting. The shafting system is cumbersome, takes up much space, is noisy and generally uneconomical and unsatisfactory; also in this system the cone pulleys employed for securing different speeds of operation of the driven machines give only approximately the speeds desired. Electrical systems for the purpose named are expensive to install, the motors occupy more space than in my system and the machines driven by electric motors require to have specially constructed or modified frames to accommodate the motors. There is also in many cases great loss in economy owing to the necessity of conversion and reconversion of energy to and from the electrical form.

My invention has reference to the employment of a secondary source of power, such, for example, as a pump which in turn may be driven by power from any source either primary or secondary, and does not have reference to the employment of primary sources of power directly, such, for example, as a waterfall or head of water.

My invention comprises a system in which a power transmitting liquid is circulated through supply and return pipes by a pump or its equivalent, in which independent hydraulic motors are connected in multiple or parallel relation with each other between the supply and return pipes, and in which there is an automatic governor for each motor for compelling that motor to run at a certain perdetermined set or fixed speed independently of the other motors, and a manually operative controller for each motor for regulating the governor of the motor and thereby compelling the motor to run at different desired set or fixed speeds.

My invention also includes, in combination, means for maintaining a substantially constant pressure of the power transmitting liquid in the supply pipe.

My invention also includes means for effecting the complete independent control of each motor as to operation, direction of operation and speed of operation; that is, as to starting and stopping of the motor, direction of rotation or reversal of the motor, and change of the set speed of the motor; all by manipulation of the aforementioned manual controller.

My invention also includes certain other features and details of construction which will hereinafter appear from the particular description of the embodiment of my invention shown.

One embodiment of my invention will now be particularly described with reference to the accompanying drawings, after which I will point out my invention in claims.

Fig. 1 shows the same parts uppermost as Fig. 3.
Fig. 1$^a$ is a perspective detail view of one of the sector-shaped segments of the rotary piston.
Fig. 4 is a plan view, with certain parts in section, of the hydraulic motor, together with the complete automatic governing and manual regulating or controlling mechanism therefor, the controlling lever being shown at the middle position, indicating that the motor is at rest; the supply valve being closed, the reversing gear being at the middle position or " on center," and the governor being in a neutral position.
Fig. 4ª is an enlarged perspective detail of the sliding collar carrying the pivots for the controlling lever and to which the governor spring is connected.

My invention comprehends a system, and does not depend upon a specific variety of hydraulic motor *per se*, but does include as a part of the system certain features of governing and controlling the motors having to do with their relation to each other and to the system as a whole. The motors are elements in the system, and those shown are of a rotary type and adapted to the requirements of my system, but it is to be understood that other types of motors, as for example, the reciprocating type, may be employed, and that my present invention is not restricted in this respect. It is also to be noted that while I have shown a steam reciprocating pump as the means for placing the power transmitting liquid under pressure and thereby circulating it in the system, it is to be understood as coming within the bounds of my present invention to substitute a different kind of pumping apparatus, as, for example, a rotary pump driven by an electric motor. The invention preferably includes, however, as a feature of the system, the automatic governing of the pump, or otherwise maintaining a uniform pressure in the power transmitting liquid supplied to the pressure side of the system. To sum up, what I have illustrated in the drawings and will now particularly describe is a practical embodiment of my invention forming a complete operative system, many particular details of which, as above noted, for instance, may be departed from without departing from the scope and conception of the system itself. Only such of these variant details are shown and described as incidentally form a part of or are necessary to a clear understanding of the system. For example, the pumping apparatus is not shown in detail, but the internal arrangement of the motors must be shown in order to understand in what manner the controlling and governing is effected.

In the motors shown 1 and 2 represent respectively the side inclosure or frame and the end pieces or heads of a rectangular casing, the frame 1 also forming a base or support for the motor. The frame and the heads of the casing are united in a liquid tight manner with interposed gaskets 3 upon which they are drawn together by bolts 4. Each head 2 has a shaft bearing 5 secured thereto by tap bolts 6, the bearings 5 supporting the two piston carrying and power transmitting sleeves 7.

Figure 1:
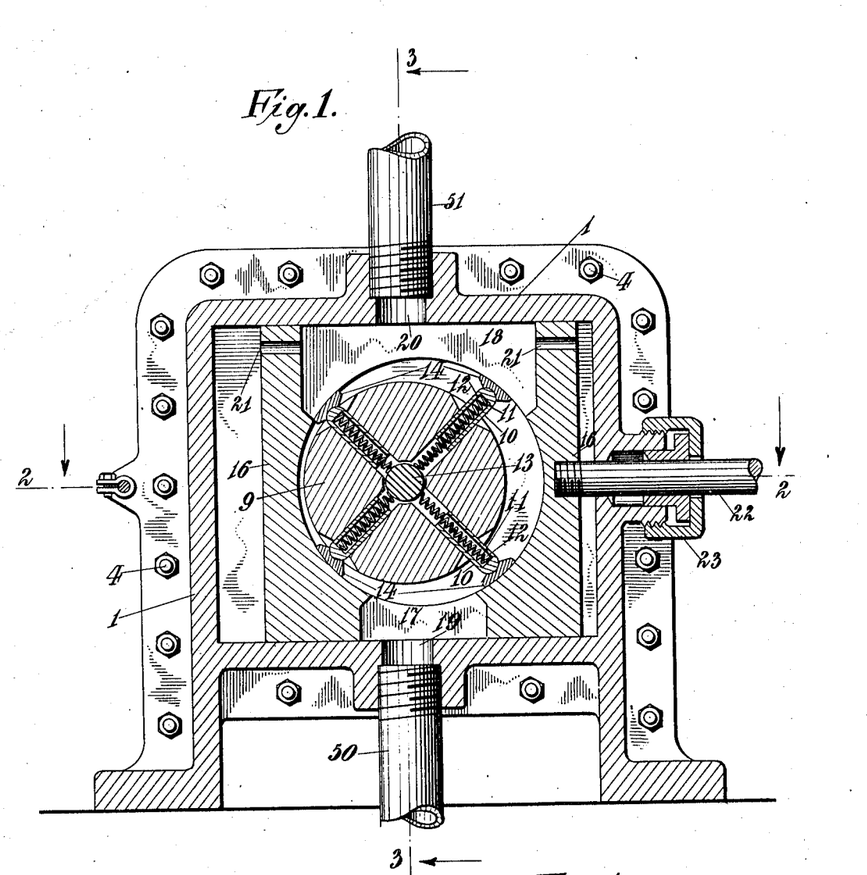
Figure 1 is a transverse sectional elevation of the hydraulic motor shown as employed in my system, the view being taken on the lines 1—1 of Figs. 2 and 3, looking toward the right, except that in Fig. 1 the rotary piston is shown as turned through an angle of forty five degrees from the position it is shown as occupying in Figs. 2 and 3.
Figure 1A:
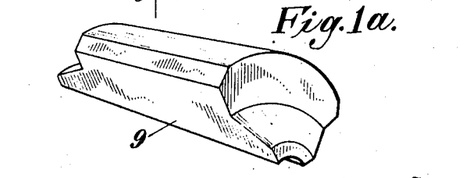

The rotary piston is made up of four sector-shaped sections 9, between which slide a corresponding number of outwardly spring pressed leaves or wings 10, each wing being pressed outward by thrust springs 11 located in recesses 12 in the wings and bearing against a shaft 13. To reduce leakage a shoe 14 is pivotally mounted at the outer edge of each wing. The piston sections are held in place and pressed against the wings by enlarged flaring cup-shaped inner ends of the sleeves 7, the sections having tapered ends (best seen in Fig. 1ª), which are engaged by ends of the sleeves on the principle of the universal chuck. The piston sections and the sleeves 7 are rotatably coupled together by screw pins 15 passing through the enlarged ends of the sleeve 7 and extending between the tapered ends of the piston sections. Differential screw threads on the ends of the shaft 13 enable the two sleeves 7 to be brought toward each other to press upon the tapered ends of the piston sections by turning the shaft in the sleeves. By reason of these differential threads a very fine adjustment of the sleeves 7 may be obtained. The shaft 13 has one end squared to permit of its being turned to make the adjustment referred to. A rectangular block 16 forms a cylinder for the piston and slides in the casing with a close fit, in a similar manner to an ordinary reciprocating piston. This block or cylinder 16 has a cylindrical bore of larger diameter than the piston, exclusive of the wings, and slides in the casing transversely to the axis of the piston, thereby making it possible, by sliding the block toward one side or the other of the casing, to produce eccentricity of the piston to its cylinder in either one of two opposite directions, or by stopping the block at the middle position to eliminate all eccentricity of the piston and cylinder to each other and produce a concentric relation, and by intermediate locations of the block to produce any desired degree more or less of such eccentricity in either direction. At opposite sides laterally of the block or cylinder 16 are inlet and exhaust ports 17, 18, registering respectively with corresponding inlet and exhaust openings 19, 20, in the casing, each port being of sufficient width to always so register at any position of the cylinder or block, the ports extending equally in opposite directions relatively to the axis of the cylinder, so as to bear like but opposite relations to the piston in opposite positions of the block or cylinder, the exhaust port being of sufficient width to prevent trapping of the exhaust by the wings of the piston such as would lock the motor. To permit the cylinder 16 to slide freely in its casing, openings 21 are provided leading from the exhaust port to the spaces between the cylinder and casing at opposite sides of the cylinder. To slide the cylinder to different positions in the casing an operating rod 22 is provided shown as screwed into the cylinder and passing to the outside of the casing through a gland 23. The operating means for this rod will be described later.

It will be apparent from the above description that when the cylinder 16 is shifted to one side of its middle position in the casing, the piston will rotate in one direction, and that when it is shifted to the opposite side the piston will rotate in the opposite direction. It will also be apparent that this motor will consume variable quantities of liquid per cycle or per revolution according to the amount of eccentricity of the piston to its cylinder, this in turn depending upon the position occupied by the cylinder in the casing. With a driving liquid supplied at any given constant or not widely varying pressure, the motor may be controlled by controlling the position of the cylinder in the casing, so as to do varying amounts of work at an unvarying or set speed, and in like manner this unvarying or set speed may be changed to other different unvarying set speeds, regardless of whether the same or a different amount of work is being done by the motor. The apparatus and mechanism for effecting this control will be described presently.

Figures 4, 4A:
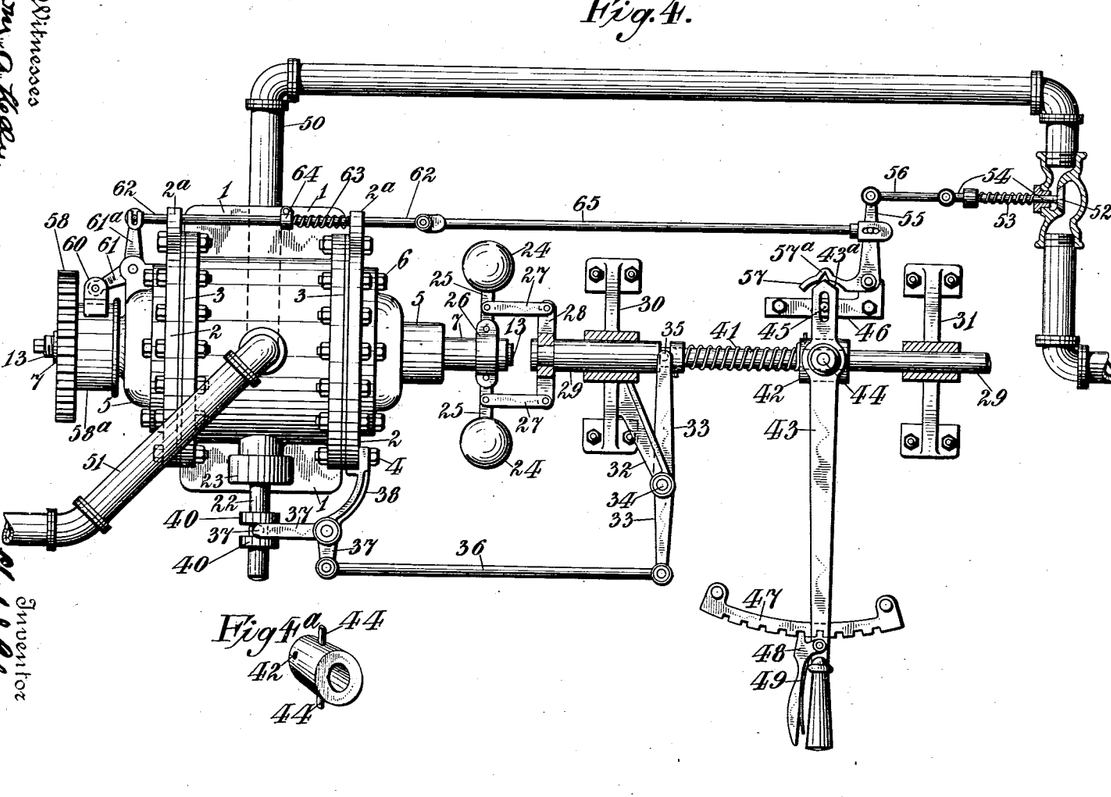

The motor employed has been specifically described, not because a motor of this specific construction, or even remotely resembling it, is necessary to the successful operation of the system, but because it is necessary to set forth some operative means by which the results desired may be accomplished. The motor is kept at a constant speed while doing varying amounts of work by means of an automatic speed-influenced governor illustrated as of the centrifugal ball type of which 24 are the balls, and 25 are arms pivotally connecting the balls to a collar or governor whirl 26 fixed upon and so as to rotate with one of the rotating sleeves 7 of the motor. Links 27 pivotally connect the arms 25 to a second collar 28 forming a governor head seated in an annular groove in the adjacent enlarged end of a slidable shaft 29 forming a governor stem, the governor stem being slidably mounted in bearings formed in supporting brackets 30, 31. The bracket 30 has an integral arm 32 for supporting a governor actuated lever 33 which is pivoted thereto at 34. One end of the lever 33 is engaged by the governor stem 29 by means of pins or lugs 35 on the lever entering a second groove in the enlarged part of the governor stem, and the other end of the lever 33 is pivoted to one end of an operating rod 36 of which the other end is pivoted to one arm of a bell-crank lever 37 in turn pivoted upon and supported by a bracket 38 bolted to one of the casing heads 2. The other arm of the bell-crank is operatively connected to the rod 22—for sliding the cylinder-block 16 in the casing 1, 2, as before explained—by means of pins 37 engaging between collars 40 fixed upon the rod 22. It will be seen from the foregoing that any movement of the governor balls upon the pivots of their arms will be communicated to the sliding cylinder-block 16. The governor has a spring 41 coiled about the smaller part of the stem 29. This spring both abuts against and is hooked into the adjacent enlarged part of the governor stem, and at its other end has a like attachment to a collar 42 (see also Fig. 4ᵃ) through which the governor stem is slidable, the spring thus being adapted to act either as a compression or as a retractile spring, the purpose of which adaptability will presently appear. The collar 42 is held in the desired fixed or stationary position by a controlling lever 43. Other parts of the controlling mechanism will be hereinafter described.

Figure 6:
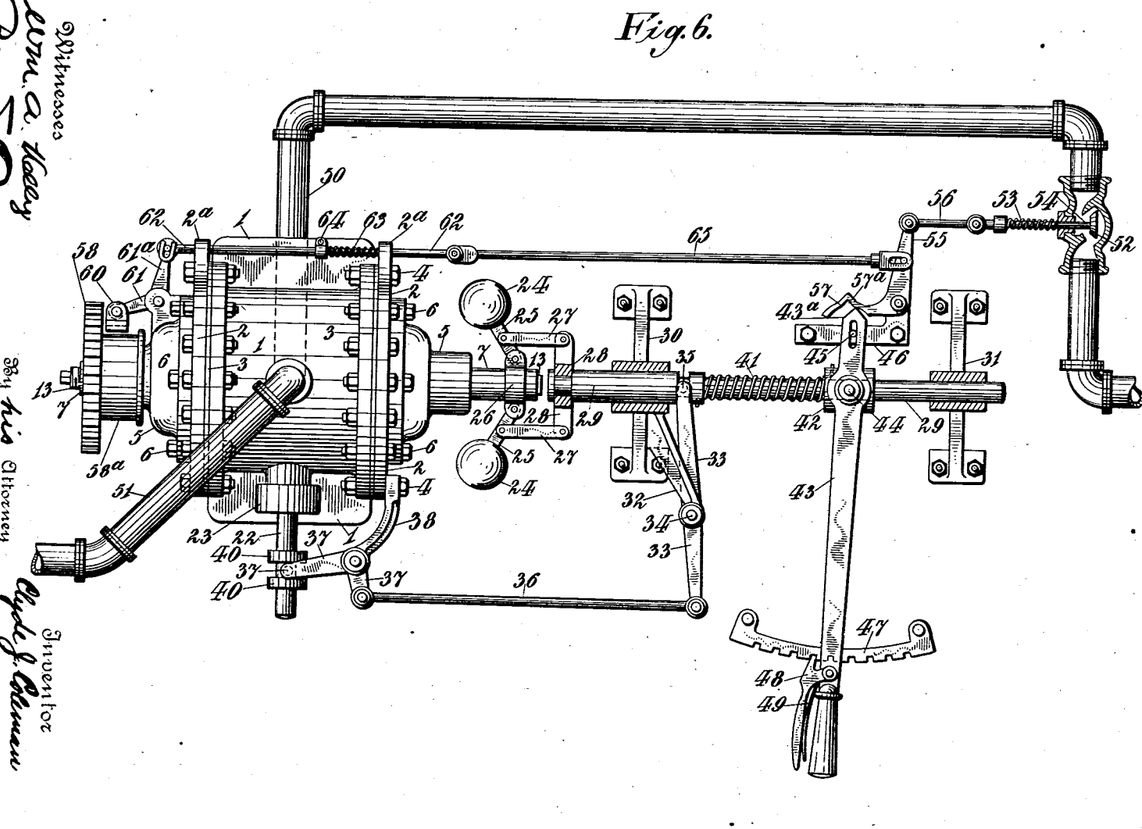
Fig. 6 is a view similar to Figs. 4 and 5, but with the controlling lever to the left, to effect the operation of the motor in the reverse direction.

For the present we will consider that the various parts are in the position shown in Fig. 6. As seen in Fig. 6 the spring 41 is acting as a compression spring and acts between the stationary collar 42 and the slidable governor stem to hold the slidable cylinder-block 16 over to the right hand position, as seen in Fig. 1, with the exception that according to Fig. 6 the block would not be so far over as it is in Fig. 1; and also acts to hold the governor balls over toward the left and swung inwardly toward their rotative axis, as seen in Fig. 6. With the parts in these positions, if a motive liquid be supplied to the motor through the inlet 19, the piston of the motor will revolve in what may be termed, for the sake of distinction, the reverse direction, and which may be indicated by saying that when viewed from the end of the motor opposite to the governor the direction of rotation would be counter-clockwise. The governor balls act upon the governor stem in opposition to the spring in the usual manner and operate in the manner already explained to slide the cylinder block, thereby altering its eccentric relation to the piston, whereby the capacity of the motor for using motive liquid per revolution is changed. In Fig. 6, as the balls move outward by centrifugal force the governor stem will be pushed toward the right and will act through the intervening connections to push in the rod or stem 22 and thus decrease the eccentricity of the piston to its cylinder, for lighter work, producing less torque in the motor with a constant speed, it being understood that means are provided whereby the pressure at which the motive liquid is supplied to the motor is unaffected by the motor, as will hereinafter appear.

The means by which the motor is reversed as to direction of rotation will now be described.

Figure 5:
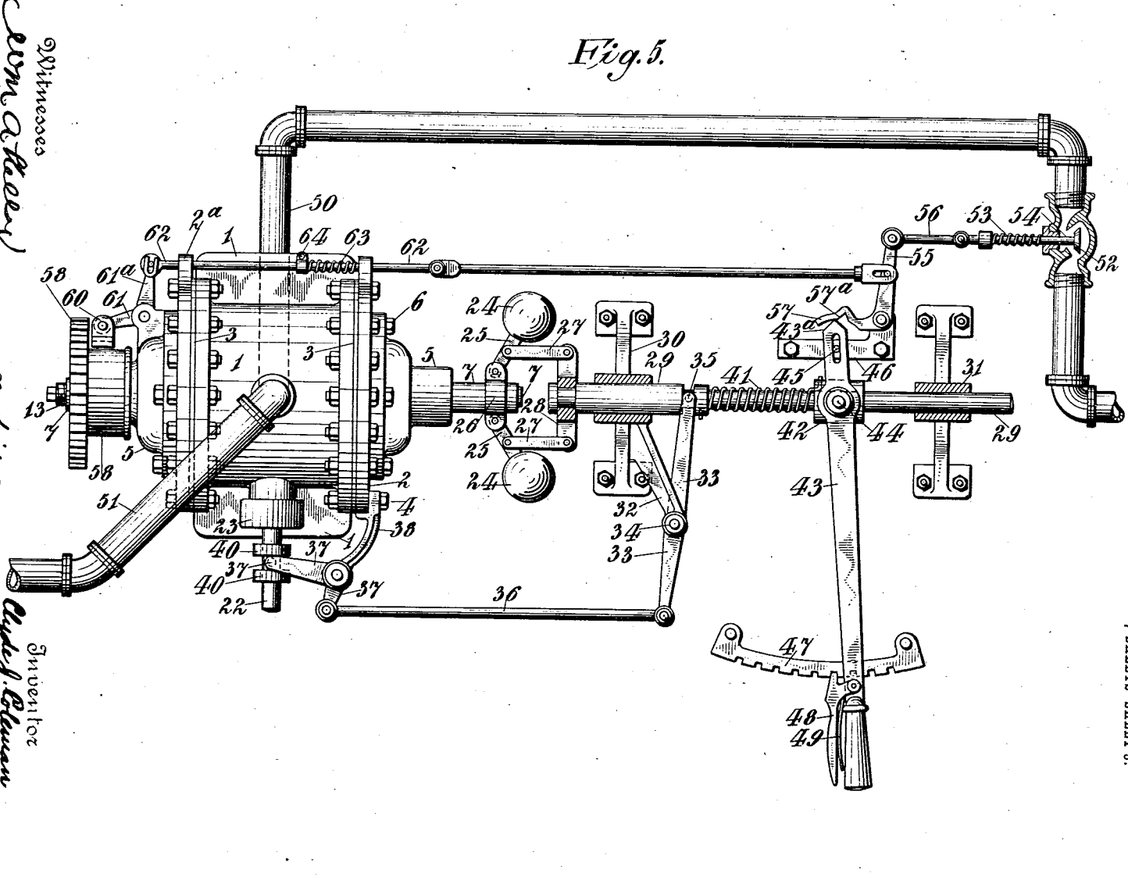
Fig. 5 is a plan view similar to Fig. 4, but with the controlling lever moved to the right, for the operation of the motor in the forward direction.

The collar 42 is pivoted to the manually operative controlling lever 43 by the pins 44 (see also Fig. 4ª). The controlling lever 43 has a stationary fulcrum formed by a pivot pin 45 carried by a bracket 46, the lever 43 being slotted to allow for its angular displacement movement. A well known arrangement of stationary rack 47 and pawl 48 with spring 49 is provided for retaining the controlling lever at any desired position at which it may be placed. For the reverse operation of the motor, as just described, the controlling lever, as shown in Fig. 6, is to the left of its middle position. The direction of rotation of the motor is changed by moving the controlling lever over to the other side of its middle position, as seen in Fig. 5. When the controlling lever is moved to this position, the cylinder block 16 will be moved over to produce an eccentricity of the piston relatively thereto opposite to that shown in Fig. 1. As the motive liquid will then pass around the piston in an opposite direction, the piston will be given an opposite direction of rotation. This result is effected because of the connection of the governor spring to the collar 42 and to the governor stem, so that when the collar 42 is moved the intermediary action of the spring causes the governor stem to partake of the motion, this motion being communicated from the governor stem to the sliding cylinder block in the manner already described, and being of sufficient extent to diametrically reverse the eccentric relation of the piston to the cylinder. Another effect of the manual movement just described of the governor stem is to swing the governor balls from their leftward position, as seen in Fig. 6, to the rightward position of Fig. 5, in which the balls are drawn in toward their rotative axis with their arms 25 inclined at an angle to their plane of rotation opposite to that formerly occupied, so that as the balls move centrifugally the governor stem will be drawn to the left against the retractile tension of the spring 41, which spring, in the former instance, acted as a compression spring. The reversed eccentricity of the piston requires, in governing, that the cylinder should slide in the opposite direction to produce the same effect of speed regulation as in the former instance, and this result takes place by reason of the governor stem being moved in the opposite direction under the influence of the balls. It is thus evident that the motor is automatically governed in the same manner irrespective of its direction of rotation.

Having reference to what is to follow, it should now be particularly noted that the direction of rotation of the motor is determined by the position of the controlling lever according to whether it is at one side or the other of a middle position. The middle position of the controlling lever, with the corresponding positions of the other parts, is shown in Fig. 4. The governor balls are shown as occupying a neutral position, and the fact that the rod 22 is in a medial position indicates that the piston now bears a concentric relation to its cylinder. The neutral position of the governor balls is merely incidental to their change from one active position to the other.

It will now be explained how a change of speed in the motor is effected.

It will be evident from the foregoing that the centrifugal governor will act, as such governors commonly do, to maintain the operation of the motor at some substantially definite fixed speed, regardless of the amount of load upon the motor, and, within certain limits regardless of the pressure at which the motive liquid is supplied to the motor. Any set speed of the motor is changed to any other desired set speed merely by moving the aforementioned controlling lever to a greater or less distance away from its middle position. For instance, if the controlling lever be locked clear over to one of its farthest positions, the pawl 48 then being in one of the end notches of the rack 47, the motor will be automatically governed to run at a higher speed than when the controlling lever occupies one of the positions indicated by Figs. 5 or 6, because, by reason of the shifted position of the spring carrying collar 42, the governor spring 41 must be put under a greater tension by the governor balls to move the sliding block 16 to a corresponding degree; or, what amounts to the same thing in the particular construction shown, when the controlling lever is in an extreme position, the sliding block 16 is also at an extreme position initially, or when the motor is at rest, and thus requires a greater extent of movement to be communicated to it by the governor, and a greater extent of movement by the governor corresponds to increased tension in the governor spring and consequent higher rotative speed. When the sliding block 16 is set to the extreme position shown in Fig. 1 the motor will run at its maximum speed, because it will initially use the maximum volume of motive liquid and under the action of the governor will continue to use the maximum amount corresponding to the highest speed. When the controlling lever is set at one of the first notches from the middle of the rack 47, as in Figs. 5 and 6, the motor will run at its minimum speed because it initially takes the smallest volume of motive fluid for which it can be set and continues under the action of the governor to take a minimum amount which corresponds to the lowest set speed. In the same manner intermediate speeds are secured by setting the controlling lever at intermediate positions. It will be noted that the heretofore described governing at a set speed in connection with this changing of the set speed of governing virtually amounts to a change-of-speed gear, performing in this respect a similar function to the usual cone pulleys, and therefore the mechanism described for effecting this function may be properly called a variable speed governor.

It is to be noted that the governor stem 29 or the rod 22 acted upon thereby might be connected to some other form of speed controlling device than the sliding block 16, for example, the rod 22 might be the stem of any well known form of throttling valve, but for well known reasons of economy it is preferable to employ for controlling the speed some construction by which the capacity of the motor for using motive liquid per cycle is changed.

We have seen so far that both the direction of rotation and the speed of rotation of the motor are determined and controlled by the controlling lever 43. We have now to see that the supply of motive liquid to the motor is controlled by the same lever.

Connected to the inlet 19 of the motor is a supply pipe 50 and connected to the outlet 20 is an exhaust pipe 51. Located in the supply pipe 50 is a supply valve 52 normally held upon its seat by a spring 53 acting upon its stem 54. The mechanism for operating the supply valve comprises a bell-crank lever pivoted upon the bracket 46 and having an arm 55 connected to the valve stem 54 by a link 56. The other arm 57 of the bell-crank is adapted to be engaged by the controlling lever 43. The arm 57 has a notch 57$^a$ into which enters the tapered end 43$^a$ of the controlling lever when the controlling lever is at its middle position, as seen in Fig. 4, there being then a little space between the arm 57 and the end of the lever, thus allowing the valve 52 to be securely seated by its spring. When the controlling lever is moved to either side of its middle position, then its tapered end 43$^a$ engages the arm 57 and actuates the bell-crank to open the supply valve 52 against the tension of its spring 53. The arm 57 has the proper curvature to cause it to continue to be engaged by the controlling lever to hold the supply valve open throughout any further movement of the controlling lever away from its middle position. It is intended that when the supply valve is moved at all, it shall be either opened to its fullest extent or completely closed, as the case may be; therefore in a rack arrangement for the lever as shown the controlling lever should completely open or close the supply valve by a movement from one notch to another next adjacent on the rack. In the construction shown, if the controlling lever be moved away from its middle position to the extent of one notch of the rack 47 the supply valve 52 will be fully opened, as may be seen in Figs. 5 and 6.

It is now seen that in my system as shown the complete control of each motor as to actuation of the supply valve, position of the reversing gear or mechanism, and regulation of the governor for changes of speed, is centralized in the single controlling lever 43 movable in a single plane to effect the results named in their proper order. For instance, when the controlling lever is moved one notch of the rack away from the middle position of Fig. 4 to the right hand position of Fig. 5, two principal results take place: The supply valve 52 is opened, as shown, and the block or cylinder 16 is moved to a position of eccentricity that will give the lowest speed for which provision is made; also, incidentally, the governor balls are moved from a neutral to an active position. As a third principal result, further movement of the controlling lever in the same direction will increase the speed at which the motor is automatically controlled by the governor, in the manner already explained.

For connecting the motor to any machine or tool to be driven, it is provided with a gear-wheel 58 fixed, as by a key 59, upon the sleeve 7 at the end of the motor opposite to the governor.

Figure 2:
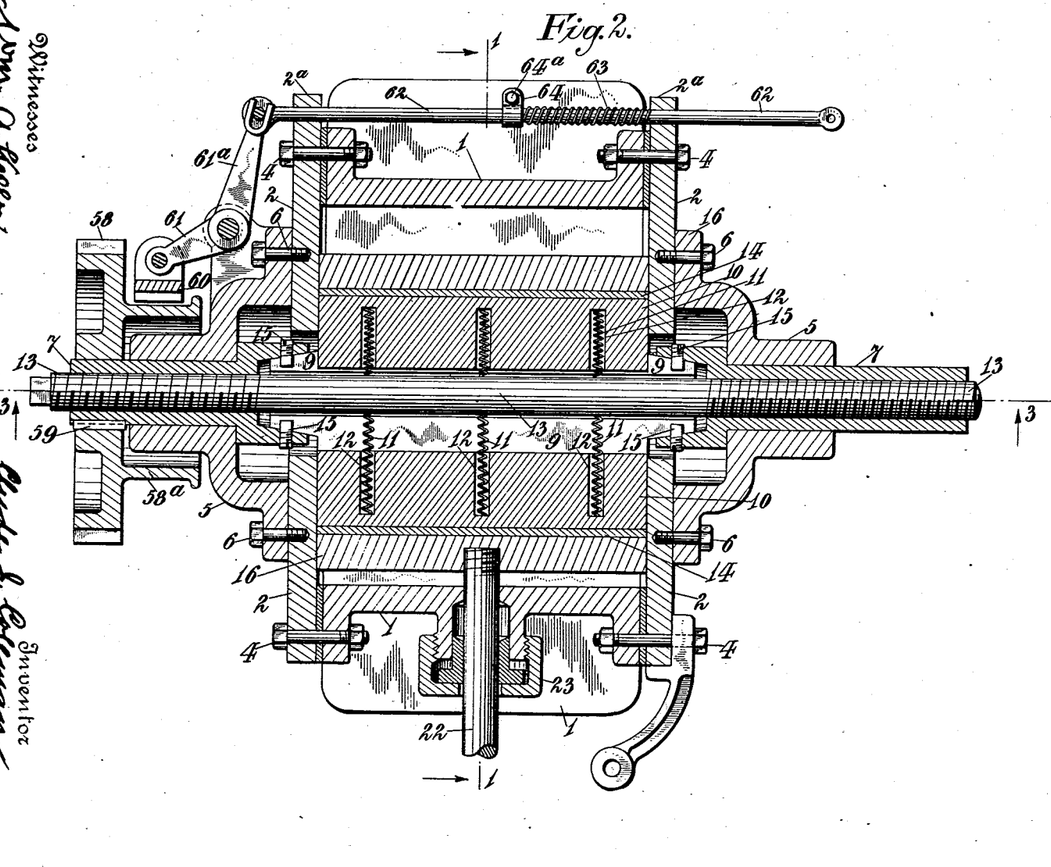
Fig. 2 is a sectional plan on the lines 2—2 of Figs. 1 and 3, excepting that the piston is angularly shifted from the position shown in Fig. 1.
Figure 3:
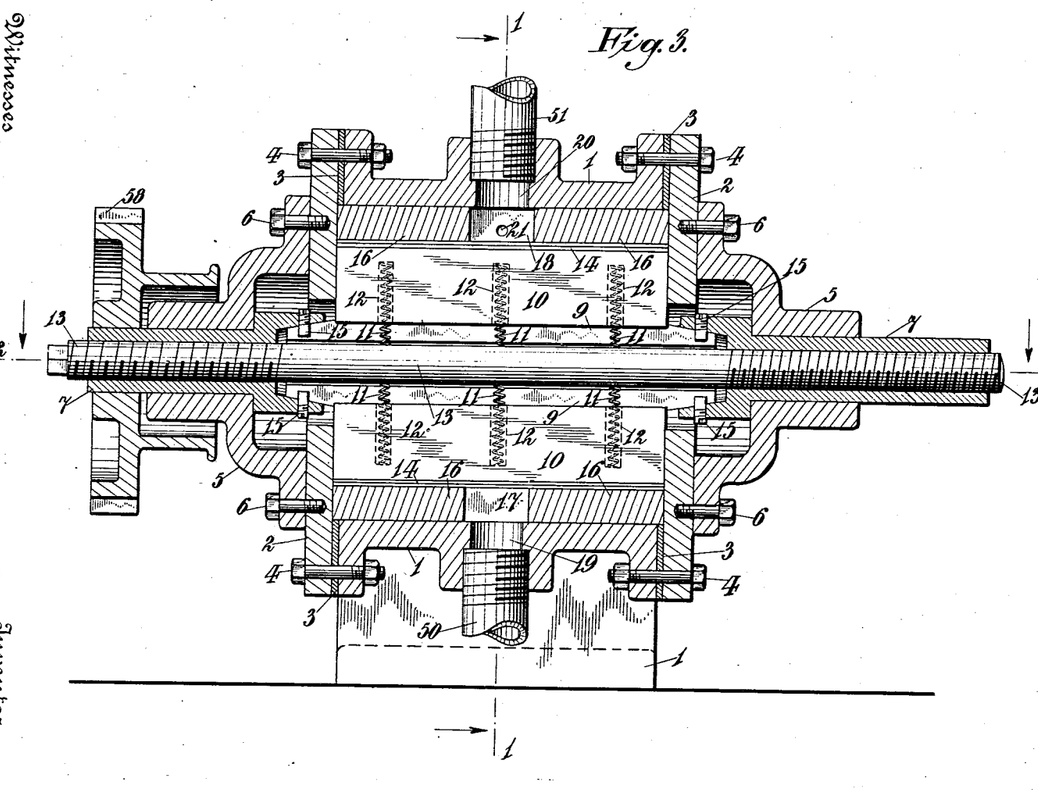
Fig. 3 is a longitudinal sectional elevation, on the lines 3—3 of Figs. 1 and 2, viewed in the direction of the arrows, the piston being in the same position as in Fig. 2, but with the wings of the piston shown in full face view instead of in longitudinal section as in Fig. 2.

The motor is supplied with a brake which becomes operative when the supply of motive liquid is shut off. A brake-shoe 60 for acting upon a flange 58$^a$ of the gear 58 is pivotally connected to an arm 61 of a bell-crank lever of which the other arm 61ᵃ is operatively connected to a push rod 62 guided by passing through integral lugs 2ᵃ on the casing heads 2 and operated to apply the brake by a compression spring 63 abutting against one of the lugs 2ᵃ and against a collar 64 adjustably clamped upon the push rod 62 by a bolt 64ᵃ. When the supply valve 52 is open the brake-shoe 60 is held out of contact with the flange 58ᵃ by a pull-rod 65 forming a connection between the push-rod 62 and the arm 55 of the valve-actuating bell-crank. The pull-rod 65 has a slotted connection to the arm 55 so that when the controlling lever 43 is at its middle position there will be a certainty that the brake will not be held out of operation by the arm 55, and also to guard against the possibility of the supply valve 52 being held open by the rod 65. As seen in Fig. 4 the brake is in the operative position, and as seen in Figs. 2, 5 and 6 the brake is out of operative position.

A motor such as described and its automatic governing and manual controlling devices, constitute a unit, of which there are a plurality in my system, and which for convenience in reference may properly be termed a "motor-set."

We now come to a consideration of that part of the system which relates to the supply of a motive liquid to a motor-set, such as has been described under conditions to which it is adapted; including the connection of a plurality of such motor-sets in the system, each set being independently operable, independently automatically governed and independently manually controllable; and also including the supply of a motive liquid under pressure in such manner that the circulatory or working pressure of the motive liquid always remains unaffected by any manipulation or governing of the motors. For example, if the same quantity of motive liquid in a given time were always forced through the supply pipe 50, it would, for evident reasons, be impossible to govern and control the motor by the means shown. In my system the pressure of the motive liquid in the supply pipe 50 is indirectly controlled by the motor, and such pressure is maintained substantially constant, though not necessarily exactly so.

Figure 7:
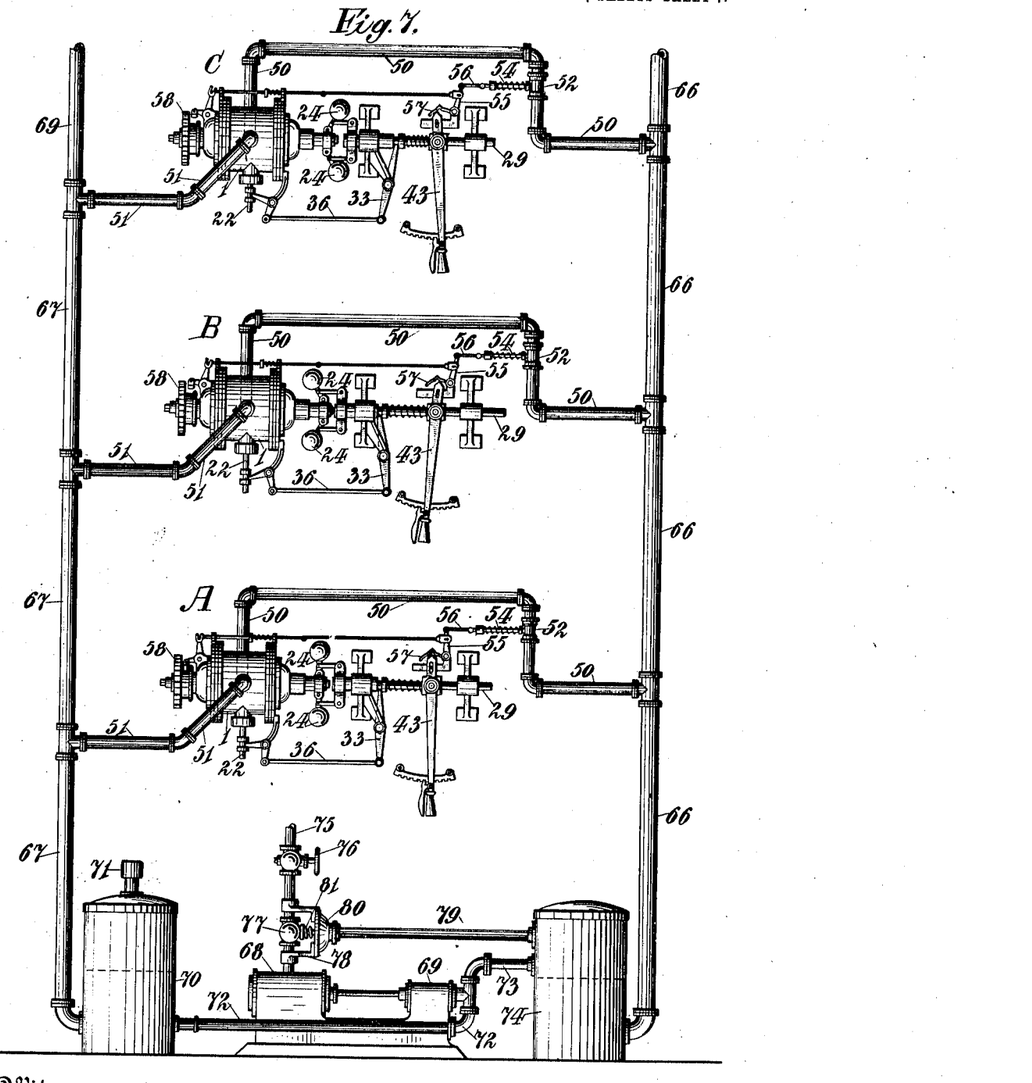
Fig. 7 is a diagram of one embodiment of my complete system, showing an automatically controlled steam-operated pump, receiving tank and pressure reservoir, pressure and return pipes, and three motors, such as shown in the previous figures, connected in the system in parallel or multiple relation with each other for independent operation and control, the automatic governing and manually operative controlling mechanism for each motor being also shown.

In Fig. 7, A, B, C, represent three motor-sets such as described, each with its supply pipe 50 connected to a common supply or pressure pipe 66, and each having its exhaust pipe 51 connected to a common return pipe 67. This arrangement of the motor-sets in parallel or multiple relation between the supply and return pipes enables the motors, in the construction shown, to be independently operated, governed and controlled.

The means shown for transferring the motive liquid from the return pipe to the pressure supply pipe and for circulating such liquid under the conditions required by the motor-sets will now be described. Such means are shown as comprising a steam operated reciprocating pump having a steam cylinder 68 and a pump cylinder 69. A receiving tank 70 is provided which receives the return or exhaust liquid from the motors from the common return pipe 67. The liquid in the receiving tank is at atmospheric pressure, as the receiving tank has at its top a neck 71, communicating with the atmosphere, and serving also as an opening by which the supply of liquid may be replenished when necessary. A pipe 72 connects the receiving tank near its bottom with the pump cylinder 69, being an outlet for the tank and a supply pipe for the pump. From the pump cylinder 69 a delivery pipe 73 extends to a pressure reservoir 74, and connected to the reservoir near its bottom is the main pressure supply pipe 66. The pump is driven by its steam cylinder 68 receiving steam from a steam supply pipe 75 controlled by a hand valve 76 therein. The intermittent entrance of the liquid to the reservoir, due to the reciprocations of the pump, is provided for by having the reservoir only partly filled with liquid, as indicated by the dotted line, the upper portion containing air.

The means shown for directly controlling the pressure of the liquid in the common pressure pipe 66 and thus maintaining it substantially constant, comprises an automatic throttle-valve 77 connected in the steam supply pipe 75 and controlled by the air pressure in the reservoir. A pipe 79 connects the upper part of the pressure reservoir with a diaphragm chamber 80 of which the diaphragm is connected to the stem 78 of the throttle-valve 77, so as to close the valve under air pressure upon the diaphragm communicated from the pressure reservoir. The closing of the throttle-valve is resisted by a spring 81. When the pressure of the motive liquid in the main supply pipe reaches the required maximum, the consequent air pressure in the reservoir will move the diaphragm against the tension of the spring and partly close the throttle, thereby slowing down the pump, and when a minimum pressure in the common liquid supply pipe is reached the reverse operation takes place. When any one or more of the motors consume a greater volume of liquid the tendency will be to lower the pressure in the pressure side of the hydraulic system, which tendency is immediately rectified by the action of the automatic throttle, which causes the pump to deliver a larger volume of liquid into the reservoir; and when the motors use a less volume of liquid the reverse effect takes place. It will thus be evident that the circulatory pressure of the power transmitting liquid in my hydraulic system is completely and entirely controlled by the motors connected in the system. It is this fact of the mutual adaptation and coöperation of all the parts of the system that renders the system complete and operative.

It will be understood that the embodiment of my invention shown and described herein may be departed from in many particulars without thereby departing from the broad scope of the invention.

Any suitable liquid may be employed as a power transmitting medium.

I claim:

1. A hydraulic power transmission system comprising a conduit circulatory system, means for circulating a power transmitting liquid in the system, a plurality of independent hydraulic motors connected in the system in parallel relation with each other, and a manually-controllable variable-speed automatic governor for each of the motors.

2. A hydraulic power transmission system comprising a conduit circulatory system, means for circulating a power transmitting liquid in the system at a substantially constant circulatory pressure, a plurality of independent hydraulic motors connected in the system in parallel relation with each other, and a manually-controllable variable-speed automatic governor for each of the motors.

3. A hydraulic power transmission system comprising a conduit circulatory system, means for circulating a power transmitting liquid in the system, a plurality of independent hydraulic motors connected in the system in parallel relation with each other, means for automatically maintaining each motor at a predetermined fixed speed regardless of the amount of its load, and a single manual device for each motor and adapted by a single movement to determine the operation and direction of operation of the motor and to regulate said automatic means so as to change the fixed speed of the motor, each motor and automatic means being constructed and arranged to coöperate with said device.

4. A hydraulic power transmission system comprising a conduit circulatory system, means for circulating a power transmitting liquid in the system, a plurality of independent hydraulic motors connected in the system in parallel relation with each other, an automatic governor for each motor, and a single manual device for each motor for determining the operation and direction of operation of the motor and for controlling the governor so as to give different set speeds to the motor, each motor and governor being constructed and arranged to coöperate with said device.

5. A hydraulic power transmission system comprising a conduit circulatory system, means for circulating a power transmitting liquid in the system at a substantially constant circulatory pressure, a plurality of independent hydraulic motors connected in the system in parallel relation with each other, a supply valve for each motor, a reversing gear for each motor, an automatic governor for each motor, and a single manual device for each motor for actuating the supply valve, for actuating the reversing gear, and for controlling the governor so as to give different set speeds to the motor, each governor being constructed and arranged to coöperate with said device.

6. A hydraulic power transmission system comprising a conduit circulatory system, means for circulating a power transmitting liquid in the system at a substantially constant circulatory pressure, a plurality of independent hydraulic motors connected in the system in parallel relation with each other, a supply valve for each motor, a reversing gear for each motor, an automatic governor for each motor, and a single manual device for each motor and which by a single movement in either direction first opens the supply valve and actuates the reversing gear and then by a further movement in the same direction regulates the governor so as to give different set speeds to the motor, each governor being constructed and arranged to coöperate with said device.

7. A hydraulic power transmission system comprising a conduit circulatory system, means for circulating a power transmitting liquid in the system at a substantially constant circulatory pressure, a plurality of independent hydraulic motors connected in the system in parallel relation with each other, each motor including means for varying the capacity of the motor as to volume of liquid consumed per cycle, and a manually controllable variable-speed automatic governor controlling said last named means.

8. A hydraulic power transmission system comprising a pressure pipe, a return pipe, means for transferring a power transmitting liquid from the return pipe to the pressure pipe, means for maintaining a substantially constant pressure in the pressure pipe, a plurality of independent hydraulic motors connected in parallel relation between the pressure and return pipes, means for automatically maintaining each motor at a predetermined fixed speed regardless of the amount of its load, and a single manual controller for each motor for determining its operation and direction of operation and for regulating said automatic means for determining the fixed speed of operation.

9. A hydraulic power transmission system comprising a pressure pipe, a return pipe, means for transferring a power transmitting liquid from the return pipe to the pressure pipe, means for maintaining a substantially constant pressure in the pressure pipe, a plurality of independent hydraulic motors connected in parallel relation between the pressure and return pipes, an automatic governor for each of the motors, and a single manual controller for each motor for determining its operation and direction of operation and for regulating the governor so as to give different set speeds to the motor, each motor and governor being constructed and arranged to coöperate with the controller.

10. A hydraulic power transmission system comprising a pressure pipe, a return pipe, means for transferring a power transmitting liquid from the return pipe to the pressure pipe, means for maintaining a substantially constant pressure in the pressure pipe, a plurality of independent hydraulic motors connected in parallel relation between the pressure and return pipes, and each motor including means for varying the capacity of the motor as to volume of liquid consumed per cycle, an automatic governor controlling said last named means, and a single manual controller for each motor for determining its operation and direction of operation and for regulating the governor, each motor and governor being constructed and arranged to coöperate with the controller.

11. A hydraulic power transmission system comprising a pressure reservoir containing a power transmitting liquid, a pressure supply pipe leading from the reservoir, a return pipe, a receiving tank into which the return pipe opens, means for transferring the liquid from the receiving tank to the pressure reservoir, means for maintaining a substantially constant pressure in the reservoir, a plurality of independent hydraulic motors connected in parallel relation between the supply and return pipes, and a manually-controllable variable-speed automatic governor for each of the motors.

12. A hydraulic power transmission system comprising a pressure reservoir containing a power transmitting liquid, a pressure supply pipe leading from the reservoir, a return pipe, a receiving tank into which the return pipe opens, a pump for transferring the power transmitting liquid from the receiving tank to the pressure reservoir, automatic means for controlling the pump and governed by the pressure in the reservoir, a plurality of independent hydraulic motors connected in parallel relation between the supply and return pipes, an automatic governor for each motor, and a manual controller for each governor for regulating the governor so as to give different set speeds to the motor, each governor being constructed and arranged to coöperate with the controller.

In testimony whereof I have affixed my signature in presence of two witnesses.

CLYDE J. COLEMAN.

Witnesses:
BERNARD COWEN,
WM. A. KELLY.